United States Patent
Seloff et al.

(10) Patent No.: US 9,107,351 B2
(45) Date of Patent: Aug. 18, 2015

(54) LOPPER DEVICES FOR PRUNING TREES AND BRUSHES

(76) Inventors: Robert Seloff, Carrollton, TX (US); Brian Scates, Dallas, TX (US); Joe Williams, Addison, TX (US)

(*) Notice: Subject to any disclaimer, the term of this patent is extended or adjusted under 35 U.S.C. 154(b) by 24 days.

(21) Appl. No.: 13/136,196

(22) Filed: Jul. 26, 2011

(65) Prior Publication Data
US 2012/0030951 A1 Feb. 9, 2012

Related U.S. Application Data

(60) Provisional application No. 61/400,279, filed on Jul. 26, 2010.

(51) Int. Cl.
B26B 13/00 (2006.01)
A01G 3/025 (2006.01)

(52) U.S. Cl.
CPC .................................. A01G 3/0251 (2013.01)

(58) Field of Classification Search
USPC ........... 30/254, 261, 134, 135, 249–252, 188, 30/190
See application file for complete search history.

(56) References Cited

U.S. PATENT DOCUMENTS

| | | | | | |
|---|---|---|---|---|---|
| 143,114 | A | * | 9/1873 | Ball | 30/122 |
| 887,494 | A | * | 5/1908 | Mulertz et al. | 30/135 |
| 1,425,779 | A | * | 8/1922 | Killin | 30/252 |
| 2,436,260 | A | * | 2/1948 | Klenk | 30/239 |
| 2,463,213 | A | * | 3/1949 | Stewart | 30/190 |
| 2,487,281 | A | * | 11/1949 | Steckelberg | 81/301 |
| 2,513,038 | A | * | 6/1950 | Merkur | 30/250 |
| 2,520,905 | A | * | 9/1950 | Borrelli | 30/237 |
| 2,561,682 | A | * | 7/1951 | Barnett | 81/375 |
| 3,688,405 | A | * | 9/1972 | Dutra et al. | 30/135 |
| 4,084,317 | A | * | 4/1978 | Nakamura et al. | 30/94 |
| 4,186,484 | A | * | 2/1980 | Tanaka | 30/92 |
| 4,674,184 | A | * | 6/1987 | Anderson | 30/92 |
| 4,899,445 | A | * | 2/1990 | Erbrick et al. | 30/251 |
| 4,964,216 | A | * | 10/1990 | Gosselin | 30/254 |
| 5,203,084 | A | * | 4/1993 | Kuo | 30/135 |
| 5,761,815 | A | * | 6/1998 | Lin | 30/251 |
| 5,904,078 | A | * | 5/1999 | Gustafson et al. | 81/417 |
| 5,950,314 | A | * | 9/1999 | Chang | 30/244 |
| 6,640,442 | B2 | * | 11/2003 | Lin | 30/251 |
| 6,735,870 | B2 | * | 5/2004 | Nordlin | 30/134 |
| 6,813,836 | B2 | * | 11/2004 | Graca | 30/259 |
| 7,073,261 | B1 | * | 7/2006 | Collins | 30/135 |
| 8,046,924 | B2 | * | 11/2011 | Block et al. | 30/249 |
| 2007/0079512 | A1 | * | 4/2007 | Nelson et al. | 30/123.3 |

* cited by examiner

*Primary Examiner* — Ghassem Alie
*Assistant Examiner* — Bharat C Patel
(74) *Attorney, Agent, or Firm* — Thrasher Associates

(57) ABSTRACT

Disclosed are shears are used for trimming bushes, trees, and brush. The loppers have the cutting blade which performs the cutting action and a counter edge for the cutting blade to work in conjunction. These loppers also have the addition of clamping jaws which will hold the severed limb. A user amputates a tree limb and the severed or orphaned limb falls helplessly to the ground, but these loppers clamp onto that limb when the cutting operation is performed. After the cut is made, the user can move the limb to a specific location, then decompresses the loppers and drop the limb as intended.

8 Claims, 5 Drawing Sheets

LOPPER DEVICES FOR PRUNING TREES AND BUSHES

CLAIM OF PRIORITY

This Application claims priority to U.S. Provisional Patent Application No. 61/400,279 to common inventor Moore et al, dated 26 Jul. 2010 and entitled Device for Pruning Trees & Bushes.

FIELD OF THE INVENTION

The present invention relates generally branch cutting and more specifically to a method, apparatus, and system for the same.

PROBLEM STATEMENT

Interpretation Considerations

This section describes the technical field in more detail, and discusses problems encountered in the technical field. This section does not describe prior art as defined for purposes of anticipation or obviousness under 35 U.S.C. section 102 or 35 U.S.C. section 103. Thus, nothing stated in the Problem Statement is to be construed as prior art.

Discussion

A variety of tools are commonly used for landscaping and trimming such as pruners or "loppers." These trimming tools can be hand tools operated manually. Typically these types of trimming devices have a lower handle member and an upper or operating handle member, which is pivotally connected to the lower handle member by a pivot pen. A blade is connected to the lower handle which cooperates with a hook blade on the upper handle through a linkage so that the blade and hook provide a cutting action when the upper handle and the lower handle are compressed together. The handles are significantly longer than the blade to generate simple mechanical advantage or the blades can be configured with a compound linkage for added cutting force.

Branches are commonly trimmed using these mechanically advantaged lopper tools. The manner of cut is of either the bypass method where sharp edged blades are offset so that they shear the branch as they pass closely by each other or the anvil method where one sharp blade pinches the branch directly against the face of the other blade.

Using loppers to cut branches overhead creates a hazard of falling debris and scattered refuse that must be collected. Trimming branches at arms length also creates scattered refuse that must be collected. Collecting the refuse requires the uncomfortable labor of repeated bending to the ground all around the work area. Therefore, there is a need in the art for improved hand loppers that address this hazard and minimizes unnecessary labor, and the present invention provides such a device.

BRIEF DESCRIPTION OF THE DRAWINGS

Various aspects of the invention, as well as an embodiment, are better understood by reference to the following detailed description. The detailed description, given by way of examples and not intended to limit the present invention solely thereto, will be better understood when read in conjunction with the drawings wherein like reference numerals denote like elements and parts in which.

Figure 5:
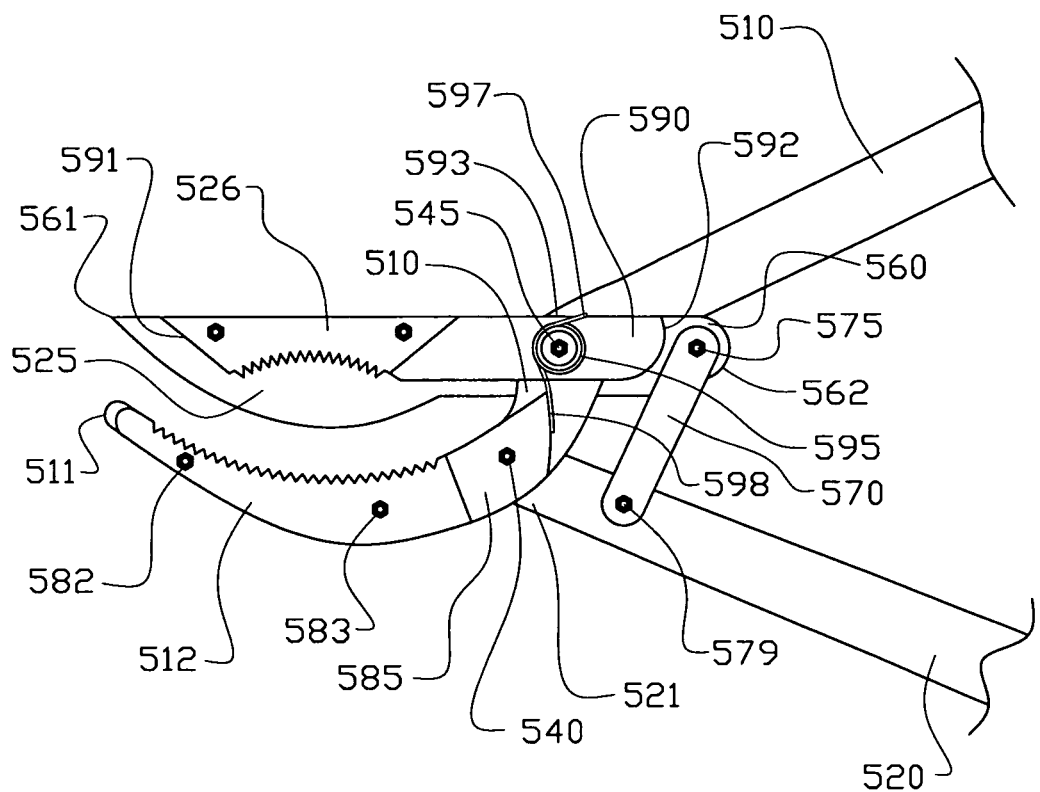

Shown in FIG. 5 is an alternative embodiment configured to allow the jaws of the loppers to move freely to adjust to the size of limbs with a spring for support.

Figure 6:
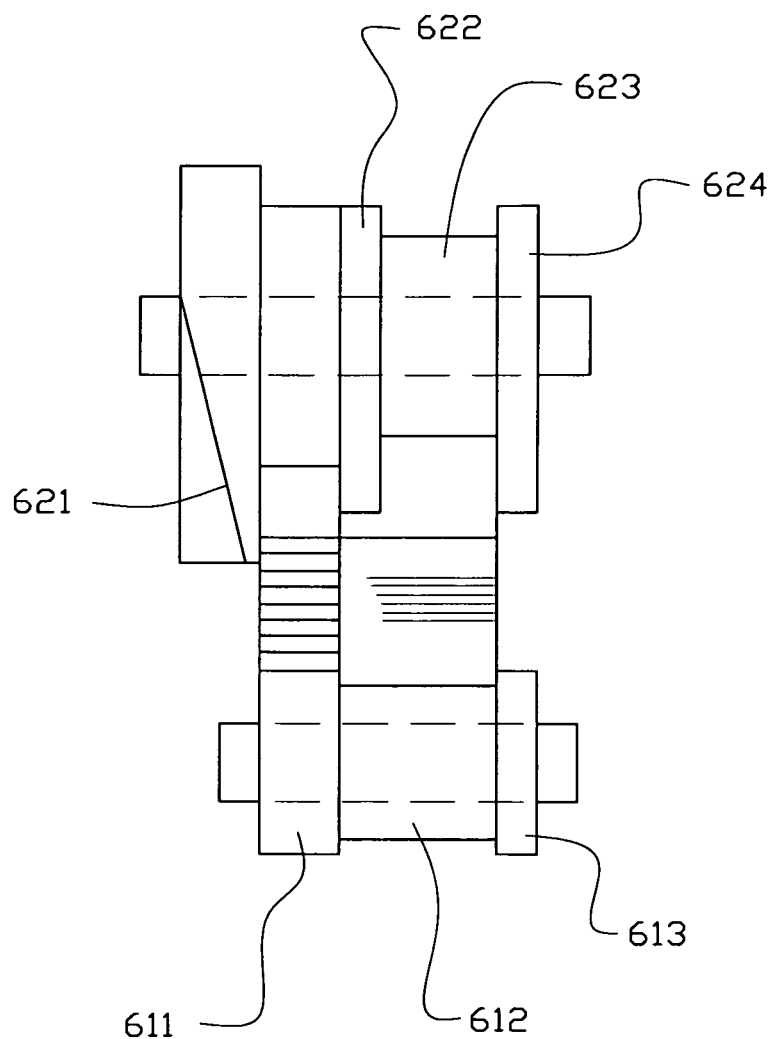

FIG. 6 is the front view of the alternative embodiment from the cutting blade to the clamping jaw according to the teachings of the invention.

EXEMPLARY EMBODIMENT OF A BEST MODE

Interpretation Considerations

When reading this section (An Exemplary Embodiment of a Best Mode, which describes an exemplary embodiment of the best mode of the invention, hereinafter "exemplary embodiment"), one should keep in mind several points. First, the following exemplary embodiment is what the inventor believes to be the best mode for practicing the invention at the time this patent was filed. Thus, since one of ordinary skill in the art may recognize from the following exemplary embodiment that substantially equivalent structures or substantially equivalent acts may be used to achieve the same results in exactly the same way, or to achieve the same results in a not dissimilar way, the following exemplary embodiment should not be interpreted as limiting the invention to one embodiment.

Likewise, individual aspects (sometimes called species) of the invention are provided as examples, and, accordingly, one of ordinary skill in the art may recognize from a following exemplary structure (or a following exemplary act) that a substantially equivalent structure or substantially equivalent act may be used to either achieve the same results in substantially the same way, or to achieve the same results in a not dissimilar way.

Accordingly, the discussion of a species (or a specific item) invokes the genus (the class of items) to which that species belongs as well as related species in that genus. Likewise, the recitation of a genus invokes the species known in the art. Furthermore, it is recognized that as technology develops, a number of additional alternatives to achieve an aspect of the invention may arise. Such advances are hereby incorporated within their respective genus, and should be recognized as being functionally equivalent or structurally equivalent to the aspect shown or described.

Second, the only essential aspects of the invention are identified by the claims. Thus, aspects of the invention, including elements, acts, functions, and relationships (shown or described) should not be interpreted as being essential unless they are explicitly described and identified as being essential. Third, a function or an act should be interpreted as incorporating all modes of doing that function or act, unless otherwise explicitly stated (for example, one recognizes that "tacking" may be done by nailing, stapling, gluing, hot gunning, riveting, etc., and so a use of the word tacking invokes stapling, gluing, etc., and all other modes of that word and similar words, such as "attaching").

Fourth, unless explicitly stated otherwise, conjunctive words (such as "or", "and", "including", or "comprising" for example) should be interpreted in the inclusive, not the exclusive, sense. Fifth, the words "means" and "step" are provided to facilitate the reader's understanding of the invention and do not mean "means" or "step" as defined in §112, paragraph 6 of 35 U.S.C., unless used as "means for -functioning-" or "step for -functioning-" in the Claims section. Sixth, the invention is also described in view of the Festo decisions, and, in that regard, the claims and the invention incorporate equivalents known, unknown, foreseeable, and unforeseeable. Seventh, the language and each word used in the invention should be given the ordinary interpretation of the language and the word, unless indicated otherwise. As will be understood by those of ordinary skill in the art, various structures and devices are depicted in block diagram form in order to avoid unnecessarily obscuring the invention.

It should be noted in the following discussion that acts with like names are performed in like manners, unless otherwise stated. Of course, the foregoing discussions and definitions are provided for clarification purposes and are not limiting. Words and phrases are to be given their ordinary plain meaning unless indicated otherwise.

Detailed Description of the Drawings

The present invention can take many forms and utilize a variety of methods to accomplish the task of gripping the cut branch in the loppers. For illustrative purposes, one such concept is demonstrated herein in the provided drawing. However, it is understood that the drawing and description are exemplary, and not limiting.

The sheers on the loppers are for the cutting of a sapling, bush, tree, or any branch. Shears are long scissors with strong blades used for cutting. The cutter can be one of a pruner, cutters, clippers, hedge clippers, nippers, scissors, or snips. Some cutters operate with just one cutting blade having the cutting blade intersecting with a rigid bar or a counter bar. Other cutters operate with two blades, a cutting blade and a counter blade. A user opens the cutter so that the cutting blade and the opposing blade are no longer intersecting. The user then encompasses a sapling with the cutting edges and then closes the cutters, the intersection cuts the sapling.

The loppers also have grippers or clamps. When the sapling is inserted into the cutters, it is also inserted into the grippers. When the user compresses the cutters to slice the sapling, the grippers clamp down on the sapling during the compression. Holding the cutters in the compressed position, ala the cutting blades are fully intersected, the grippers are compressed tightly around the orphaned piece of the sapling holding it in a fixed position so that it does not fall helplessly to the ground. The user is then able to move the orphaned piece to a desired location and the user can drop the piece by uncompressing the cutters and grippers.

The present invention incorporates a fixed jaw attached flush to the cutting edge of one of the lopper blades and extending laterally to support the cut refuse branch. The second blade is fitted with a moving grip jaw that extends laterally opposite of the fixed jaw and travels with the blade until engagement with the branch retards continued rotation. A spring of significant force is compressed between the grip jaw and the cutting blade as the cutting blade continues to travel through the branch. The spring provides pressure on the grip jaw to clamp the branch between the grip jaw and the stationary jaw after the cut is complete. The spring loaded grip jaw has sufficient travel to accommodate varying branch sizes up to the capacity of the lopper. Once the cut is complete, the lopper can be used to transport the refuse branch to a convenient location. Opening the lopper releases the refuse branch.

Figure 1:
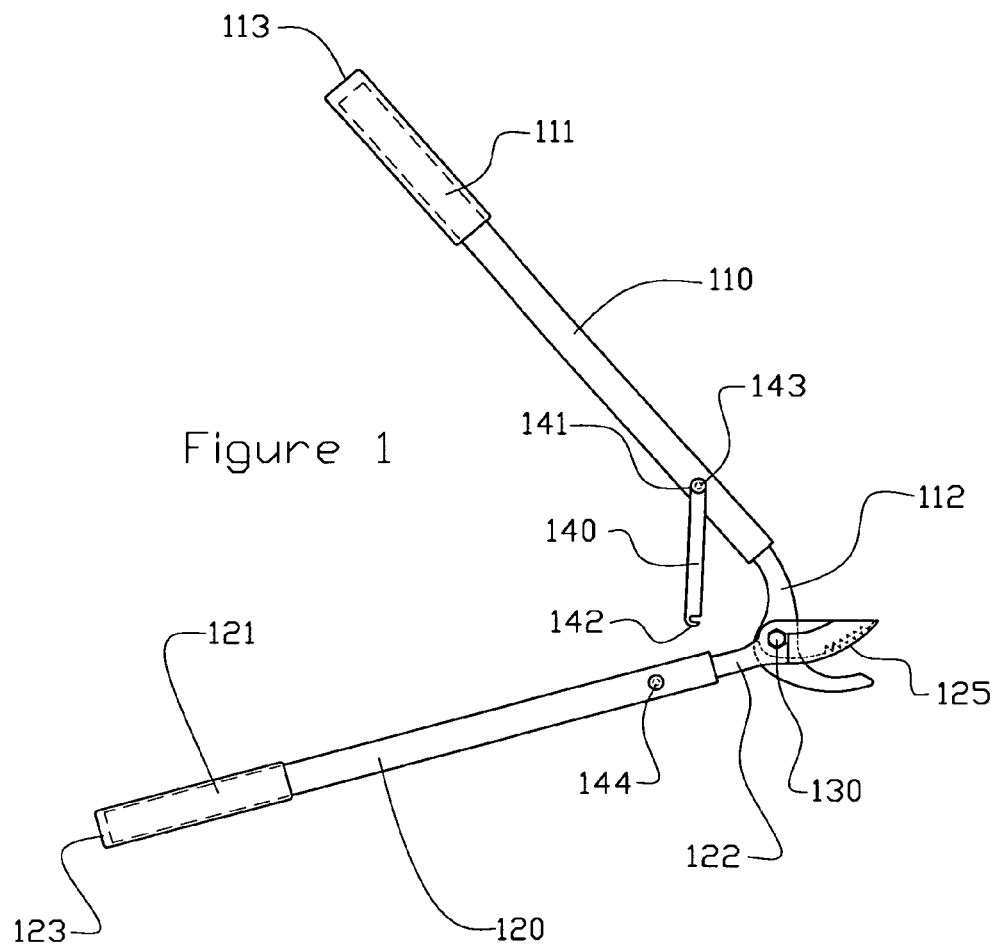
FIG. 1 is a side view of the cutting side of the apparatus according to the teachings of the invention.

FIG. 1 is a side view of the cutting side of the apparatus according to the teachings of the invention, also known as a "lopper" or "loppers." The lopper has two bars: a first bar 110 and second bar 120 each with a handle end 112, 122 and a cutter end 111, 121. The bars 110, 120 are composed of a stiff material such as metal or plastic. Each bar 110, 120 has a handle 113, 123 which adds extra grip for the user. The handle is made of a rubberized material. Other substitutive flexible materials are suitable alternatives such as a polymer or foam. The first bar 110 intersects with the second bar 120 and is secured via a bolt 130. Alternative connections can be used instead of the bolt such as a rivet, a pin, and a washer. The bars 110, 120 pivot on this connector 130. The intersection is placed closer to the cutting ends 111, 121 in order to create more torque on the cutting operation. A lock bar 140 has a pivot end 141 and hook end 142. The pivot end is secured to the first bar 110 via a pin 143 and swivels freely. The hook end 142 is an open hook that secures a pin 144 on the second bar 120 when the first and second bars 110, 120 are fully compressed together. The cutting end blade 125 faces the opposite cutting end 111, inward instead of outward. The embodiment is shown in the open position with the cutting blade 125 on the near side in this view. The first bar cutting end 111 is the bottom jaw 111 in this embodiment.

There is a top jaw on the cutting end of the second bar, but its view is blocked by the cutting blade 125. The top jaw will be shown in a later figure. The bolt 130 which connects the first and second bar also connects the jaws. The top jaw is offset of the cutting blade 125 so that the jaw trails in the downward action so that when the cutting blade 125 is brushing the side of the bottom jaw 111, the top jaw leaves an opening between it and the opposing bottom jaw 111. Described is the closed position of the toppers and the aforementioned opening allows for the jaws to secure the orphaned limb of the sapling. When the loppers are in the open position, shown in FIG. 1, the cutting ends 111, 121 are positioned around a tree or brush sapling. Compressing the handles 113, 123 together, the cutting ends 111, 121 slice the sapling accordingly. Once the sapling has been cut, with the loppers still in the closed position, the user still has control of the orphaned limb of the sapling through the jaws. The user then opens the cutting ends 111, 121 vof the loppers by pulling the handles 113, 123 apart and thus releasing the orphaned limb of the sapling at the desired location.

Figure 2:
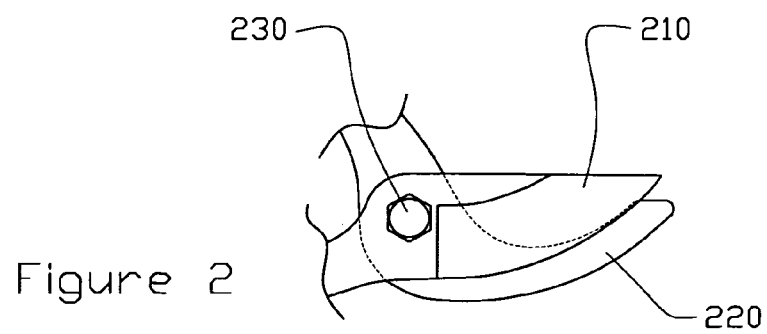
FIG. 2 is a side view of the cutting blade intersecting with the counter edge.

Shown in FIG. 2 is the intersection of the cutting blade 210 and the counter edge 220. The blade 210 and the counter edge 220 are secured together via a bolt 230 which holds the horizontal relationship between the pieces but allows them to swivel rotating around the bolt 230 for cutting action. As the cutting edge 210 intersects with the counter edge 220, the sapling is cut. On the other side are the jaws which are not shown in this figure but are illustrated later.

Figure 3:
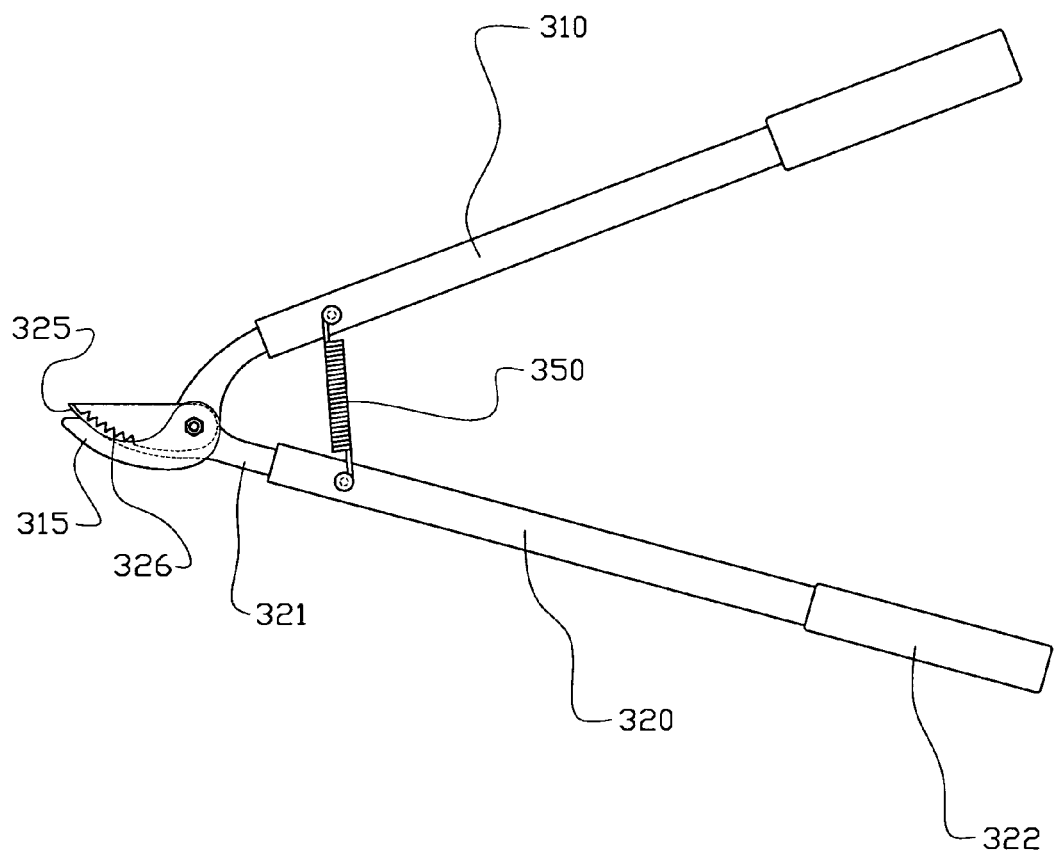
FIG. 3 is a side view of the clamping jaw side of the apparatus according to the teachings of the invention.

FIG. 3 shows the jaw side of an embodiment and in this embodiment also includes a tension spring 350 which assists in cutting torque and adds pressure to secure the orphaned limb in the jaws as well. The spring 350 is attached between the first bar 310 and the second bar 320. The second bar 320 has a first end 321 and a second end 322. The first end 321 has a cutting blade 325 and a cutting jaw 326 attached to the blade 325 so that the cutting portion of the blade protrudes farther than the cutting jaw 326. This allows the loppers to cut a limb and secure the orphaned piece as well. For smaller limbs, the loppers encompass the limb at the rear of the cutting jaw 326. At the rear of the cutting jaw 326, the distance between the cutting jaw and the counter jaw 315 is small allowing the loppers to secure smaller limbs. For larger limbs, the loppers encompass the limb towards the center of the cutting jaw 326.

Figure 4:
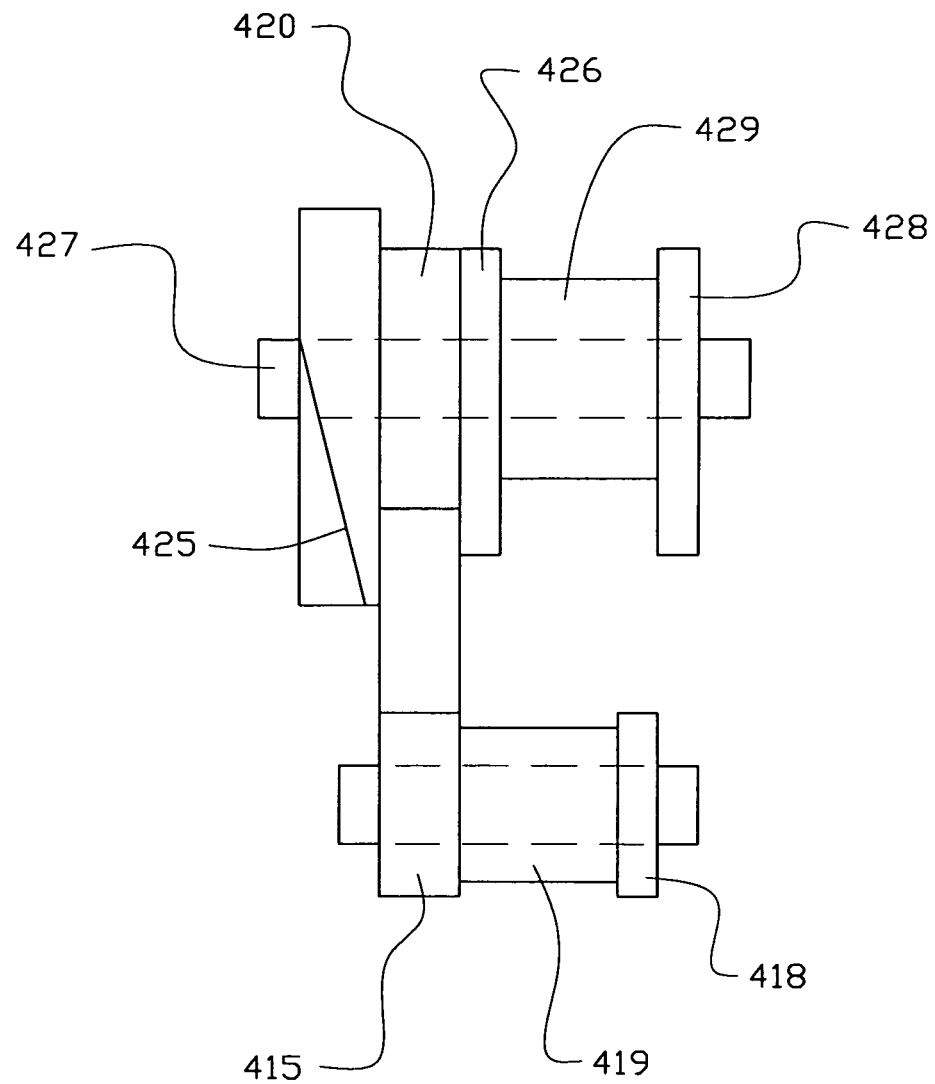
FIG. 4 is a front view of the embodiment from the cutting blade to the clamping jaw.

FIG. 4 shows the front view of the cutting portion of the loppers. This view shows how the cutting blade 425, the cutting jaw 426, and the counter jaw 415. The cutting blade 425 is on the side. The blade 425 can be on the front or back, top or bottom. The sharp edge of the blade 425 is focused towards the center. In this embodiment, the blade 425 is on the top, front side. The cutting jaw 426 operates in proximity to the cutting blade 425. In some embodiments, the cutting jaw 426 is affixed to the cutting blade 425 as shown in this embodiment via a pin 427. In an alternative embodiment, the cutting jaw 426 is not affixed to the cutting blade 425 and the two do not operate in uniformity. In this embodiment, the cutting blade 425 also operates the cutting jaw 426 as the two are coupled together. The cutting jaw 426 is secured via a pin screw 427, but other securing mechanisms can be used such as a weld, bolts, or an epoxy. The bottom counter jaw 415 is also the first end of the first bar. In this embodiment, extra jaws are added to the cutting jaw 426 and counter jaw 415. The addition of each jaw adds extra control over the removed limbs. The counter jaw 415 that is on the same side as the cutting blade 425 is offset so that when the jaw 415 is compressed, the cutting blade's path travels on the outside of the counter jaw 415 thus allowing a limb to be cut when the blade and jaw intersect.

In this embodiment, the additional jaw sections 418, 428 are added with molded spacers 419, 429. The cutting blade 425 is coupled to the second bar 420 and which couples the first top jaw 426. The first top jaw 426 is connected to a top spacer 429. A second top jaw 428 is coupled to the top spacer 429 for the additional support. The bottom first jaw 415 is part of the first end of the first bar. A bottom spacer 419 is connected to the bottom first jaw 415. A second bottom jaw 418 is affixed to the bottom spacer 419. The second jaws 418, 428 add support to more firmly secure clipped limbs.

Shown in FIG. 5 is an alternative embodiment configured to allow the jaws of the loppers to move freely to adjust to the size of limbs with a spring for support. The embodiment has a first bar 510 and a second bar 520. The first bar 510 has a first end 510 and a second end, not shown but understood by those with ordinary skill in the art similarly to previous figures. The second end has a handle to add a grip to the loppers. The first end 510 the first bar has an angular protrusion that is offset which forms the first counter jaw 512, the lower jaw, which doubles use as the counter edge for the cutting blade 525. An alternative embodiment adds a counter blade to the lower jaw section which decreases torque needed for cutting saplings. In this embodiment, the offset counter jaw 512 is part of the first end of the first bar. The second bar 520 has a first end 521 and a second end not shown in this figure. The second end of the second bar also has a handle for extra gripping. The second bar's first end 521 couples to the first bar 510 near the rear of the counter jaw section 512 via a bolt 540 or pin. The cutting bar 560 is coupled to the first bar 510 above the offset counter jaw 512 via a bolt 545 or pin. The cutting bar 560 has a cutting end 561 and a counter end 562 and the bolt 545 or pin is centered between the cutting end 561 and counter end 562 so that the cutting bar 560 may pivot about that point. The counter end 562 is coupled to a counter block 570 or pivot block via a bolt 575 or pin. The counter block is a small bar that couples the cutting bar 560 to the second bar 520. The counter block is coupled at its first end to the counter end 562 of the cutting bar 560. The second end of the counter block is coupled to the second bar 520 via a bolt 579 or pin in proximity, but behind the pin 540 coupling the first bar 510 to the second bar 520.

The clamping jaws 512, 526 which hold orphaned limbs are incorporated in this embodiment. The lower clamping jaw 512, the counter jaw, was formed into the first end 511 of the first bar 510, the upper side of the first end 511 of the bar 510 had teeth cut into it in order to grip or clamp onto limbs Additional support for clamping purposes is added by coupling another flat bar shaped with teeth cut into its upper side and fitted for uniformity with the lower clamping jaw 512 and coupled to the first bar 510 via a bolt 582, 583 at each end of the jaws 512 respectively. A spacer 585 is inserted between the lower jaws 512 in order to add more clamping control. Having a clamp that grips a limb in two places adds control. The upper jaw 526, also known as the cutting jaw because of proximity to the cutting blade 525, is a flat bar with teeth formed on one side for extra control. These teeth are etched into the flat bar in an inverted half circular or oval shape to fit around a round or oval limb. The upper jaw 526 is affixed to an upper jaw bar 590 with a jaw end 591 and a counter end 592. The upper jaw bar 590 is coupled to the first bar 510 on the same pin as the cutting bar 560. The cutting bar 560 and the upper jaw bar 590 are on opposite sides of the first bar 510. The pin 545 is inserted through a central hole in the upper jaw bar 590 which is in between the counter end 592 and the jaw end 591. This pin 545 allows the upper jaw bar 590 to pivot. The counter end 592 has a top protrusion edge 593 or groove allowing a spring edge 597 to push against said edge 593 and control the upper jaw bar 590 by forcing the pivot action and support.

The spring 595 utilized in this embodiment is a torsion spring which is encompasses the pin 545 used for the upper jaw bar 590, first bar 510, and cutting bar 560. The first end 597 of the torsion spring adds a compression force against the top edge 593 of the upper jaw bar 590 and the other second end 598 of the torsion spring 595 pushes against the rear of the lower jaw spacer 585 of the first bar. When a spacer 585 is used on the lower jaw section 512, a groove is added to the rear of the spacer 585 allowing the torsion spring's second end 598 a secure pressure point of contact which creates more control and minimizes slippage of the spring 595. When the user compresses the first bar 510 and the second bar 520, the cutting blade 525 passes next to the lower jaw 512 of the first bar 510 which cuts the limb. The orphaned section of the limb is clamped between the jaws, upper 526 and lower 512, where the spring 595 controls the force applied to the limb to secure it. For larger limbs, more compression force is applied to the torsion spring. This embodiment allows for the loppers to cut and control many different sized limbs.

FIG. 6 is the front view of the alternative embodiment from the cutting blade to the clamping jaw. This view shows the first bar's first end 611 which is the jaw section of the first bar. Coupled to the first bar is a lower spacer 612 which is a hard plastic section, rigid metal is a suitable alternative. Coupled to the spacer 612 is another jaw section 613, the lower second jaw. On the top side of this view is the cutting blade 621 which is also connected to the first bar (not shown in this view), but at a point above the lower jaw 611. On the opposite side of the first bar, but on the same pin, is the upper jaw 622. The upper first jaw 622 is coupled to an upper spacer 623, which on its other side is coupled to an upper second jaw 624. The spacer 623 encompasses and secures the base of the first upper jaw 622. This view shows how the jaws work with the spacers to add more control to the clamping ability of the loppers.

We claim:

1. A tool for cutting comprising:
 a first bar having a lower jaw and a handle, the lower jaw terminating at a first bar end and the handle terminating at a second bar end, the first bar also having a hole between the lower jaw and the handle, and wherein the lower jaw has a second hole located between the first hole and the first bar end;
 a second bar having a second bar's first end, a fastener in proximity, but behind the second hole, and a handle terminating at second bar's second end, wherein the second bar's first end being coupled to the first bar at the second hole;

a cutting bar having a cutting blade on a first cutting bar end and a counter end on the second cutting bar end, the cutting bar secured to the first hole via a center pin, the center pin allows the cutting bar to pivot thereabout; a cutting blade with a cutting end and a counter end; a counter block pivottaly couples the cutting bar to the second bar by said fastener;

an upper jaw bar with a first upper jaw bar end and second upper jaw bar end, the first upper jaw bar end having the cutting blade affixed thereto, and the second upper jaw bar end having a top edge, the second upper jaw bar end being coupled to the first bar via the center pin, and the upper jaw bar being coupled to the first bar opposite the cutting bar;

a counter jaw having a first counter jaw end and a second counter jaw end, the second counter jaw end affixed to the first bar and the second bar simultaneously at the second hole; and a spring having a first spring end and a second spring end, the spring encompasses a body portion of the center pin with the second spring end being configured to press against a rear portion of the counter jaw and the first spring end being configured to press against the top edge of the upper jaw bar.

2. The apparatus in claim 1 wherein the first handle and second handle each have a soft polymer forged with hand grips.

3. The apparatus in claim 1 wherein a tension spring couples the first bar and second bar behind the pivot pin.

4. The apparatus in claim 1 where the lower jaw section has a similarly shaped spacer coupling a secondary jaw piece also similarly shaped and oriented.

5. The apparatus in claim 1 where the upper jaw has a similarly shaped spacer coupling a secondary jaw piece also similarly shaped and oriented.

6. The apparatus in claim 4 where the spacer has a rear groove molded to fit the second end of the torsion spring.

7. The apparatus in claim 1 where a counter blade is secured to the lower jaw section.

8. The apparatus in claim 1 where the spring is a torsion spring.

* * * * *